United States Patent
Browalski et al.

(10) Patent No.: US 6,179,394 B1
(45) Date of Patent: Jan. 30, 2001

(54) ACTIVE BRAKE BALANCE CONTROL METHOD

(75) Inventors: Edmund S. Browalski, West Bloomfield; Stephen R. Pastor, Farmington Hills; Ronald Paul, Detroit, all of MI (US)

(73) Assignee: General Motors Corporation, Detroit, MI (US)

( * ) Notice: Under 35 U.S.C. 154(b), the term of this patent shall be extended for 0 days.

(21) Appl. No.: 09/188,137

(22) Filed: Nov. 9, 1998

(51) Int. Cl.$^7$ .................................................. B60T 8/60
(52) U.S. Cl. ................................................ 303/146; 701/38
(58) Field of Search ................................ 303/146, 139, 303/169, 191, 192; 180/41, 197; 701/38, 69, 70

(56) References Cited

U.S. PATENT DOCUMENTS

| | | | | |
|---|---|---|---|---|
| 5,869,943 | * | 2/1999 | Nakashima | 318/586 |
| 5,913,578 | * | 6/1999 | Tozu | 303/140 |
| 6,052,641 | * | 4/2000 | Wuerth | 701/70 |

* cited by examiner

*Primary Examiner*—Christopher P. Schwartz
*Assistant Examiner*—C. J. Bartz
(74) *Attorney, Agent, or Firm*—Christopher DeVries

(57) ABSTRACT

An improved control method that utilizes active brake controls to provide vehicle control during conditions of carriage motion tendency about a longitudinal vehicle axis. Accordingly, the control may be integrated with known active brake controls that regulate yaw rate and/or slip angle or traction controls that regulate front wheel slippage, thereby significantly improving the functionality of the respective control for little or no additional cost. A measure of vehicle carriage motion tendency is determined by computing a control parameter based on the roll angle of the vehicle and the rate of change of roll angle. If the computed control parameter exceeds a first calibrated threshold, a condition of carriage motion tendency is detected and the active brake control actuators are activated to reduce the velocity of the front wheels of the vehicle by a delta velocity command determined as a function of the roll angle and roll angle rate. When the computed control parameter falls below a second calibrated threshold, the delta velocity command is gradually decayed to exit the control.

9 Claims, 4 Drawing Sheets

ACTIVE BRAKE BALANCE CONTROL METHOD

TECHNICAL FIELD

This invention relates to a motor vehicle active brake control (ABC) method.

BACKGROUND OF THE INVENTION

Active brake controls (ABC) have been used to improve vehicle handling under conditions of non-linear wheel operation (i.e., lateral wheel movement relative to a road surface) by applying differential braking forces to left and right wheels of the vehicle with the objective of bringing the vehicle yaw rate and/or slip angle into conformance with desired values provided by a linear reference model. See, for example, the U.S. Pat. No. 5,720,533 to Pastor et al., issued on Feb. 24, 1998, assigned to the assignee of the present invention, and incorporated herein by reference.

SUMMARY OF THE INVENTION

The present invention is directed to an improved control method that utilizes active braking of the front wheels of a vehicle to provide vehicle balance control during conditions of carriage motion tendency relative to the longitudinal vehicle axis. Accordingly, the control may be integrated with known active brake controls that regulate yaw rate and/or slip angle, or traction controls that regulate front wheel slippage, thereby significantly improving the functionality of the respective control for little or no additional cost.

According to the invention, a measure of carriage motion tendency of a revolving type relative to the longitudinal axis (hereinafter "carriage motion tendency") is determined by computing a control parameter based on the roll angle of the vehicle and the rate of change of roll angle. If the computed control parameter exceeds an enable threshold, a condition of carriage motion tendency is detected and the brake control actuators are activated to reduce the velocity of the front wheels of the vehicle by a delta velocity command determined as a function of the roll angle and roll angle rate, so as to saturate the lateral adhesion capability of the front tires. When the computed control parameter falls below a disable threshold, the delta velocity command is gradually decayed to exit the control.

DESCRIPTION OF THE PREFERRED EMBODIMENT

Figure 1:
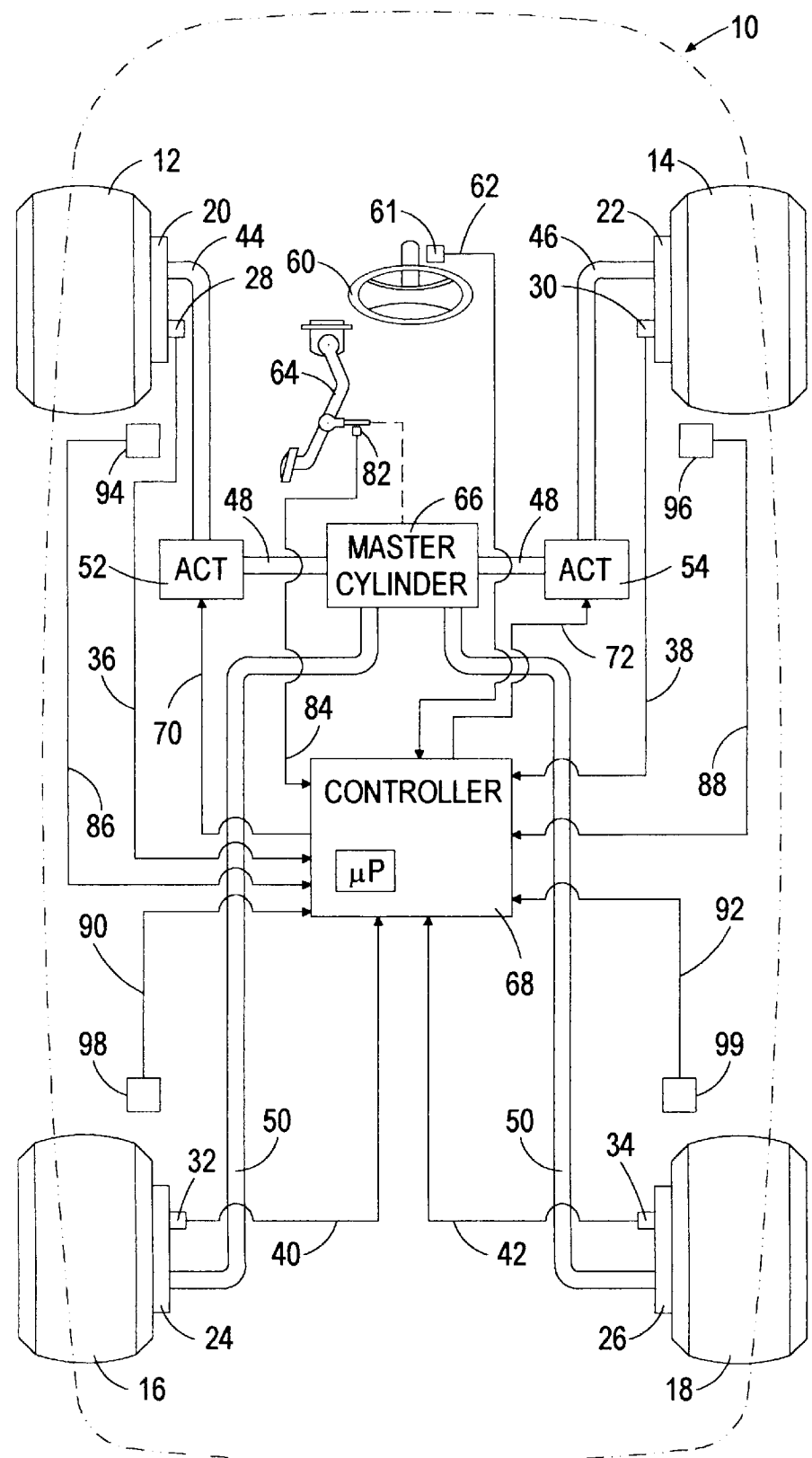
FIG. 1 is a diagram of a vehicle including an electronic controller and associated input and output devices constituting a control system for carrying out an active brake control according to this invention.

FIG. 1 depicts a mechanization of an active brake control (ABC) on a front wheel drive vehicle 10. The vehicle 10 includes a brake system including a brake pedal 64 mechanically coupled to a master cylinder 66 for producing hydraulic pressure in proportion to the force applied to pedal 64. The master cylinder 66, which may include a pneumatic booster (not shown), proportions the hydraulic pressure among the front and rear brake supply lines 48 and 50 in a conventional manner. Front supply lines 48 are coupled to the left front service brake 20 via ABC actuator 52, and to the right front service brake 22 via ABC actuator 54. Rear supply lines 50 are coupled directly to the left and right rear wheel brakes 24 and 26.

The micro-processor based controller 68 controls the operation of the ABC actuators 52, 54 via lines 70, 72 for braking the front wheels 12, 14 independent of master cylinder 66 as required to enhance the lateral carriage (i.e., body) position control of the vehicle. The controller 68 receives various inputs, including wheel speed signals on lines 36, 38, 40, 42 from respective wheel speed sensors 28, 30, 32, 34; an optional brake pedal travel signal on line 84 from pedal travel sensor 82; a steering wheel angle signal on line 62 from angle sensor 61, and relative position signals on lines 86, 88, 90, 92 from wheel position sensors 94, 96, 98, 99. The sensors 28, 30, 32, 34, 61, 82 94, 96, 98, 99 may be implemented with conventional devices in a manner known to those skilled in the art. In particular, the relative position sensors 94, 96, 98, 99 sense the relative positions of the sprung and un-sprung frame elements (not shown) at each corner of the vehicle 10, and are commonly used in active suspension control systems, such as the Real Time Damping System (RTD) featured in certain vehicles produced by General Motors Corporation. Other sensors such as yaw rate and lateral acceleration sensors may also be used.

In performing active brake control, the controller 68 modifies the normal braking of one or more of the wheels 12, 14 via the respective actuators 52, 54 in order to produce a corrective yaw moment. Exemplary actuators are shown and described in detail in the U.S. Pat. No. 5,366,291, assigned to the assignee of the present invention. In general, however, the actuators 52, 54 operate during active brake control to isolate the respective brakes 20, 22 from the master cylinder 66, and then increase or decrease the respective brake pressures to cause the individual wheel speeds to conform to respective target speeds chosen to produce the desired handling characteristic. See, for example, the U.S. Pat. No. 5,015,040 to Lin, issued on May 14, 1991, assigned to the assignee of the present invention, and incorporated herein by reference. In yaw rate and/or slip angle control, the target speeds are selected to produce a left-to-right wheel speed differential corresponding to a desired corrective yaw moment. In the control of the present invention, the target speeds are selected to reduce the velocity of the front wheels of the vehicle by a delta velocity command determined as a function of the roll angle and roll angle rate of the body or carriage. Other controls, such as anti-lock brake control, may also be integrated into the active brake system.

Figure 2:
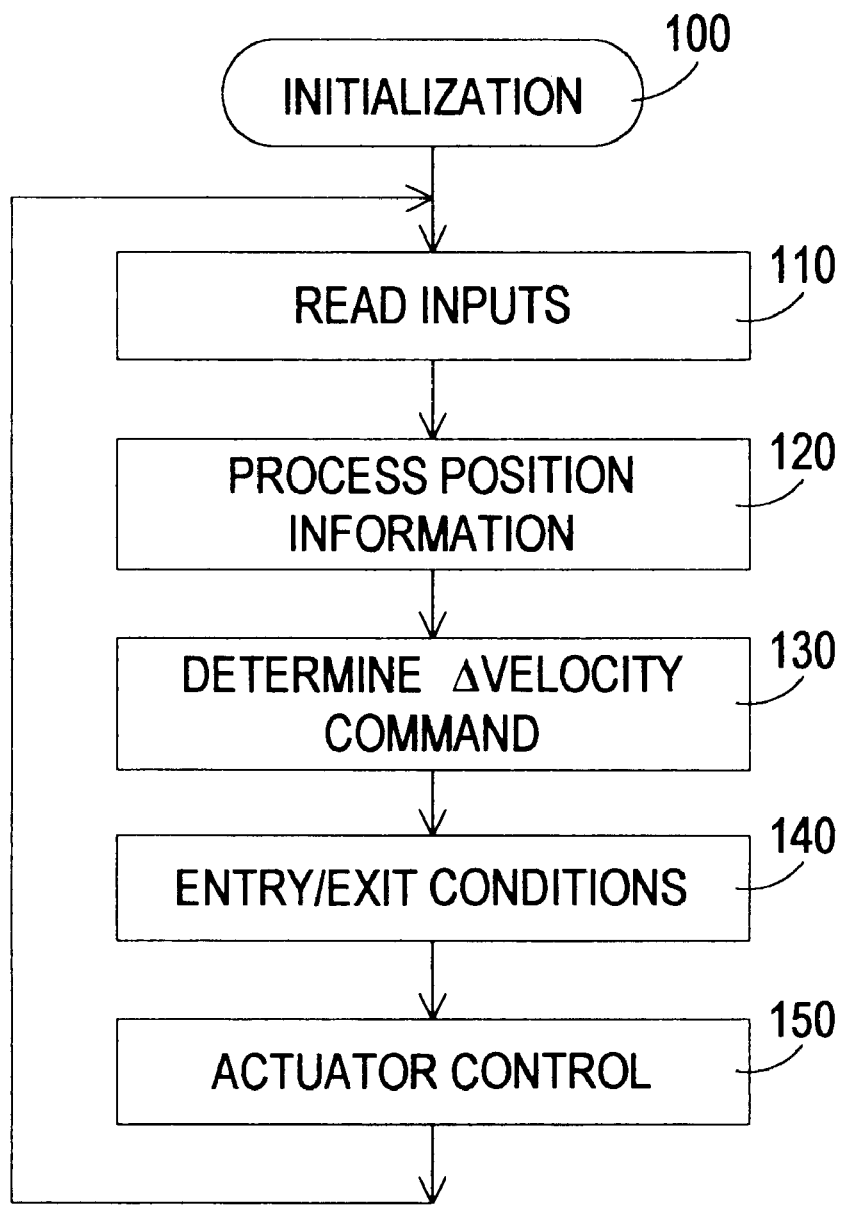
FIG. 2 is a main loop flow diagram representative of computer program instructions executed by the electronic controller of FIG. 1 in carrying out the control of this invention.

A main flow diagram for an active brake control incorporating the balance control of this invention is set forth in FIG. 2. Referring to FIG. 2, the reference numeral 100 designates a series of initialization instructions executed at the initiation of vehicle operation for properly initializing certain variables and flags to initial values. Thereafter, the block 110 is executed to read the various sensor inputs, including the wheel speed signals on lines 36–42 and the relative position signals on lines 86–92. Then the block 120 is executed process the relative position information, determining filtered and unfiltered values of the vehicle roll angle RA and roll rate RR; see following description of FIG. 3.

Figure 4:
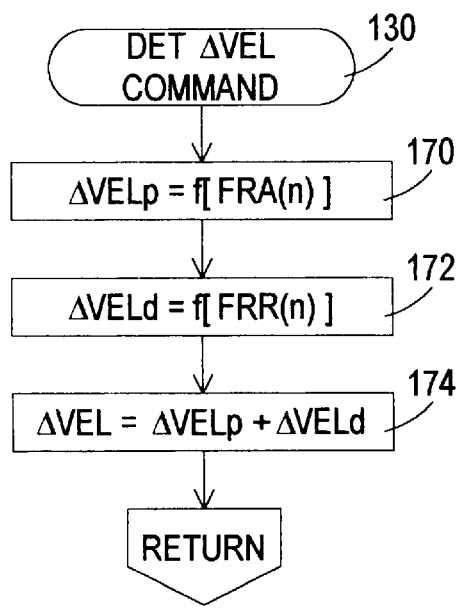
FIG. 4 is a flow diagram of an example implementation for block 130 of FIG. 2 concerning the determination of a delta velocity command.

Then block 130 is executed to determine a ΔVelocity command or velocity reduction command for the front wheels 12, 14 based on the filtered roll angle FRA and the filtered roll rate FRR; see following description of FIG. 4. The entry/exit conditions for balance control are determined at block 140, described below in detail in reference to the flow diagram of FIG. 5. Finally, the block 150 is executed to control the brake actuators 52 and 54 to regulate the front wheel speeds at the target values when balance control is active.

Figure 3:
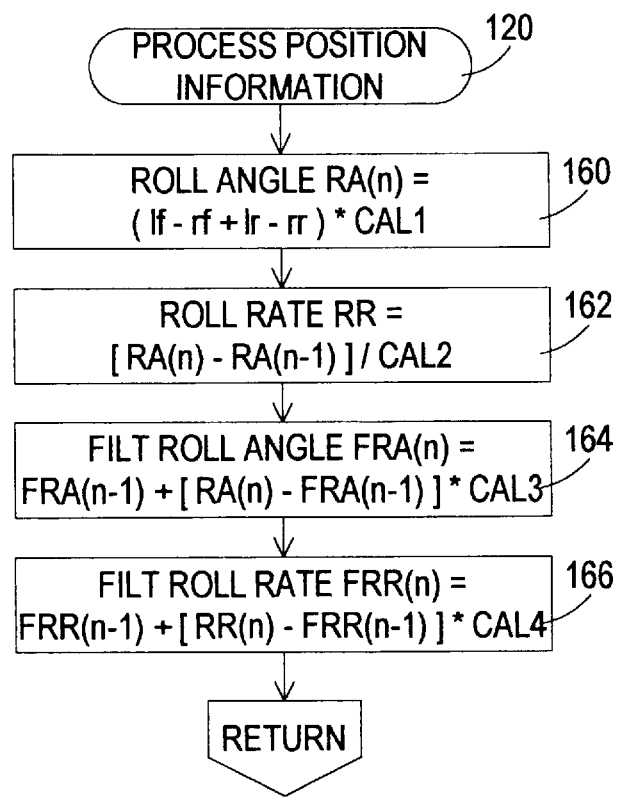
FIG. 3 is a flow diagram detailing a flow diagram block of FIG. 2 concerning the processing of carriage motion tendency information.

Referring to FIG. 3, the main flow diagram block 120 comprises the individual steps of computing current values of roll angle RA and roll rate RR based on the relative position signals lf, rf, lr and rr, and filtered versions of such values. The relative position signals lf, rf, lr and rr correspond to the position measurements at the left-front, right-front, left-rear and right-rear wheels 12, 14, 16, 18. In block 160, the term CAL1 represents a calibration constant that converts the left-to-right relative position difference (lf–rf+lr–rr) to roll angle; for small angles, CAL1 has a value of 360/π/T, in degrees/mm, where T is the vehicle track. In block 162, the roll rate RR is determined according to the difference between the current and last roll angles the time period between the two samples. The filtered roll angle FRA and filtered roll rate FRR are determined at blocks 164 and 166 with simple first order filters having respective gain factors CAL3 and CAL4. Sample values of the gain factors are CAL3=0.4 and CAL4=0.05.

Referring to FIG. 4, the main flow diagram block 130 comprises the individual steps of determining proportional and derivative ΔVelocity terms ΔVELp, ΔVELd and an overall ΔVelocity term ΔVEL. The proportional term ΔVELp is determined as a function of the filtered roll angle FRA as indicated at block 170, and the derivative term ΔVELd is determined as a function of the filtered roll rate FRR as indicated at block 172. The proportional and derivative terms may be computed or determined by table look-up. As indicated at block 174, the overall ΔVelocity term ΔVEL is computed as the sum of ΔVELp and ΔVELd.

Figure 5:
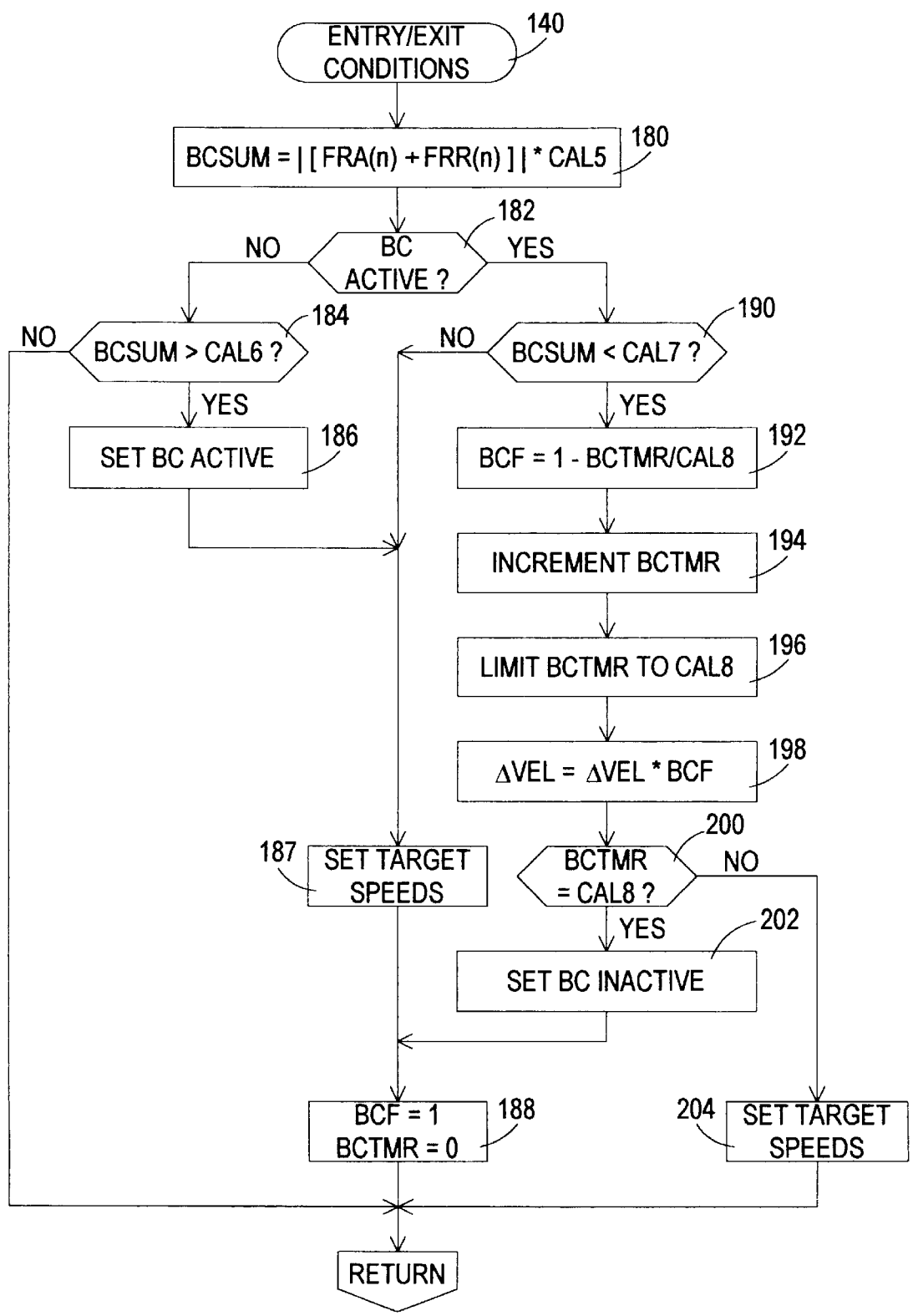
FIG. 5 is a flow diagram of an example implementation of block 140 of FIG. 2 concerning entry and exit conditions for the balance control.

FIG. 5 details the entry/exit conditions of the main flow diagram block 140. Essentially, the balance control is enabled or disabled based on a balance control sum BCSUM determined at block 180. As indicated BCSUM is defined as the absolute value of the sum of the filtered roll angle FRA and the filtered roll rate FRR, multiplied by a calibrated scale factor CAL5. If balance control (BC) is inactive and BCSUM is less than or equal to a calibrated enable threshold CAL6, as determined at blocks 182 and 184, balance control remains inactive. However, if BCSUM exceeds the enable threshold CAL6 indicating possible impending carriage motion or rotation about the vehicle longitudinal axis, blocks 186–188 are executed to activate balance or carriage motion tendency control (BC), to set the target speeds for the front wheels 12, 14, and to initialize exit condition parameters. The target speeds indicated at block 187 include a right-front target speed RFtar determined according to the difference ($\omega_{RF}$–ΔVEL) and a left-front target speed LFtar determined according to the difference ($\omega_{LF}$–ΔVEL), where $\omega_{RF}$ and $\omega_{LF}$ represent the vehicle reference speed at the right and left wheels 14, 12, respectively. It will be recognized by those skilled in the art that the vehicle reference speed may be variously determined depending on the type of vehicle drive train; in a front wheel drive vehicle, for example, the vehicle reference speed may be determined as the average of the rear wheel speeds. In any case, the vehicle reference speed at a given front wheel 12, 14 can then be determined based on steering angle or other factors. The exit condition parameters initialized at block 188 include a balance control factor BCF (initialized to 1.0) and a balance control timer BCTMR (initialized to zero).

Once block 182 determines that balance control (BC) is active, and BCSUM remains at least as great as a calibrated disable threshold CAL7, as determined at block 190, balance control remains active and blocks 187–188 are executed to update the right-front and left-front target speeds RFtar, LFtar and to re-initialize the exit condition parameters. However, if BCSUM is below the disable threshold, the blocks 192–204 are executed to gradually decay ΔVEL to zero. The balance control factor BCF, initialized to 1.0 at block 188, is updated at block 192 according to the difference (1–BCTMR/CAL8), where CAL8 is a calibrated value corresponding to the decay period, and applied to ΔVEL at block 198. The balance control timer BCTMR, initialized to zero at block 188, is incremented at block 194, limited to CAL8 at block 196, and compared to CAL8 at block 200. So long as BCTMR is less than CAL8, the block 202 is executed to update the right-front and left-front target speeds RFtar, LFtar as described above in reference to block 187, but using the attenuated value of ΔVEL determined at block 198. When BCTMR has been incremented up to CAL8, the term ΔVEL is fully decayed since factor BCF is zero, and blocks 202 and 188 are executed to deactivate balance control (BC) and to re-initialize the exit condition parameters BCF and BCTMR. By way of example, and without limitation, sample values of the calibration parameters defined in FIG. 4 are as follows: CAL5=0.4, CAL6=6.0, CAL7=3.0, and CAL8 is set to a value corresponding to 1.0 sec.

In operation, it will thus be seen that carriage motion tendency control is enabled to reduce the front wheel speeds by a determined amount ΔVEL whenever BCSUM is greater than the enable threshold CAL6. When BCSUM falls below the disable threshold CAL7, the determined amount ΔVEL is attenuated by a gradually diminishing gain factor BCF to gradually return the vehicle to normal operation. However, if BCSUM rises above the disable threshold CAL7 before the factor BCF has been reduced to zero, the control is reactivated at the determined amount ΔVEL and the gain factor BCF is reinitialized to 1.0. The determined amount ΔVEL is based on the filtered roll angle FRA and filtered roll rate FRR, which in turn, are determined based on the relative position signals lf, lr, rf, rr. Thus, this invention is easily implemented in an active brake control or traction control vehicle with only a small additional cost. Obviously, the control may alternatively be implemented as a stand-alone system, if desired. While disclosed in reference to the illustrated embodiment, it is expected that various modifications to the above-described control will occur to those skilled in the art, and it should be understood that controls incorporating such modifications may fall within the scope of the present invention, which is defined by the appended claims.

What is claimed is:

1. A method of operation for an active brake control on a vehicle having left and right front wheels adapted to be braked by the active brake control independent of driver braking effort, the method comprising the steps of:

determining a roll angle of the vehicle;

determining a rate of change of the roll angle of the vehicle;

determining a velocity reduction command for control of carriage motion of the vehicle relative to a longitudinal vehicle axis based on the determined roll angle and the rate of change of the determined roll angle; and detecting a condition of carriage motion tendency of the vehicle, and in response to such detection, braking the left and right front wheels so as to reduce their speeds by said velocity reduction command.

2. The method of operation set forth in claim 1, wherein the step of determining the roll angle of the vehicle comprises the steps of:

measuring a relative displacement between sprung and unsprung masses of the vehicle at corners of said vehicle; and determining the roll angle according to a difference of said measured displacements.

3. The method of operation set forth in claim 1, wherein the step of determining the velocity reduction command comprises the steps of:

filtering said determined roll angle and said rate of change of roll angle;

determining a proportional velocity reduction component as a function of said filtered roll angle;

determining a differential velocity reduction component as a function of said filtered roll rate; and determining the velocity reduction command according to a sum of said proportional and differential velocity reduction components.

4. The method of operation set forth in claim 1, wherein the step of braking the left and right front wheels comprises:

determining a vehicle speed at the left and right front wheels;

setting target speeds for the left and right front wheels based on a difference between the respective determined speeds and the determined velocity reduction command; and braking the left and right front wheels to regulate the speeds of such wheels at the respective target speeds.

5. The method of operation set forth in claim 4, including the step of:

periodically re-determining said velocity reduction command so long as a condition of lateral imbalance is detected.

6. The method of operation set forth in claim 1, wherein the step of detecting a carriage motion tendency of the vehicle comprises the steps of:

determining a measure of carriage motion tendency based on said determined roll angle and said rate of change of roll angle; and detecting a condition of carriage motion tendency when said determined measure exceeds an enable threshold.

7. The method of operation set forth in claim 6, including the step of:

resetting the detection of carriage motion tendency when said determined measure of carriage motion tendency falls below a disable threshold, and thereafter gradually reducing said velocity reduction command over a predefined interval.

8. The method of operation set forth in claim 7, including the step of:

re-detecting the condition of carriage motion tendency if the determined measure of carriage motion tendency exceeds said disable threshold during said predefined interval.

9. The method of operation set forth in claim 6, wherein the step of determining the measure of carriage motion tendency includes the steps of:

filtering said determined roll angle and said rate of change of roll angle; and determining said measure of carriage motion tendency according to the absolute value of a sum of said filtered roll angle and said filtered rate of change of roll angle.

* * * * *